O. A. PARKER.
DEMOUNTABLE RIM.
APPLICATION FILED JAN. 10, 1917.
1,384,274.
Patented July 12, 1921.
2 SHEETS—SHEET 1.
FIG. 1.
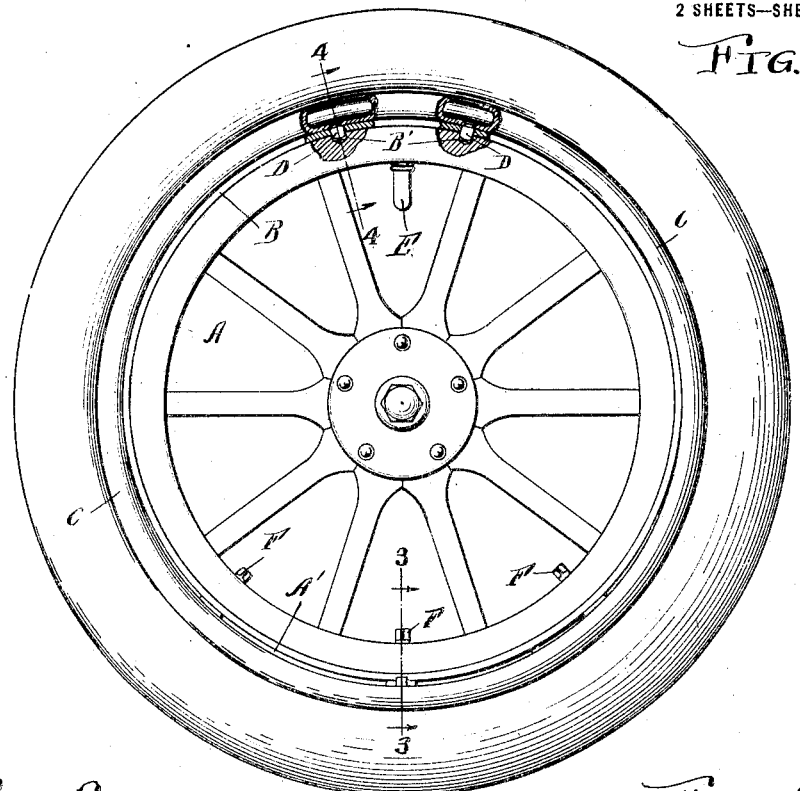
FIG. 3.
FIG. 4.
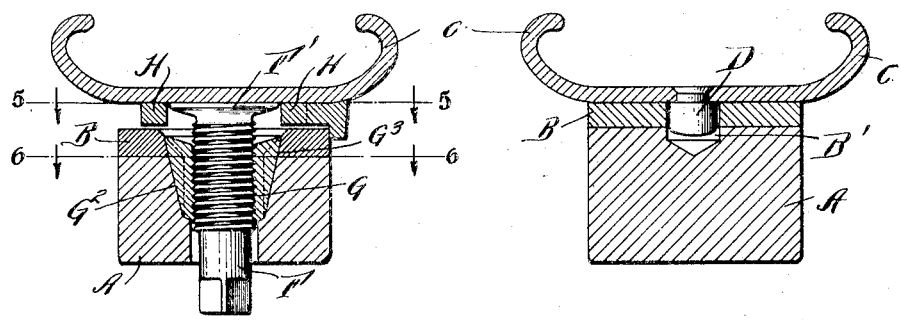
FIG. 5.
FIG. 6.
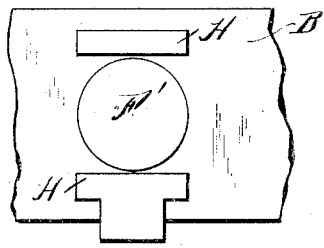
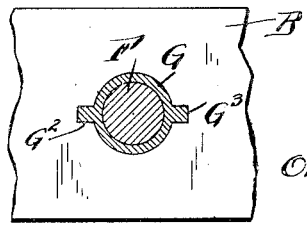
Inventor,
Orrel A. Parker.
By Hull Smith Brock & West
Attys.

O. A. PARKER.
DEMOUNTABLE RIM.
APPLICATION FILED JAN. 10, 1917.
1,384,274.
Patented July 12, 1921.
2 SHEETS—SHEET 2.
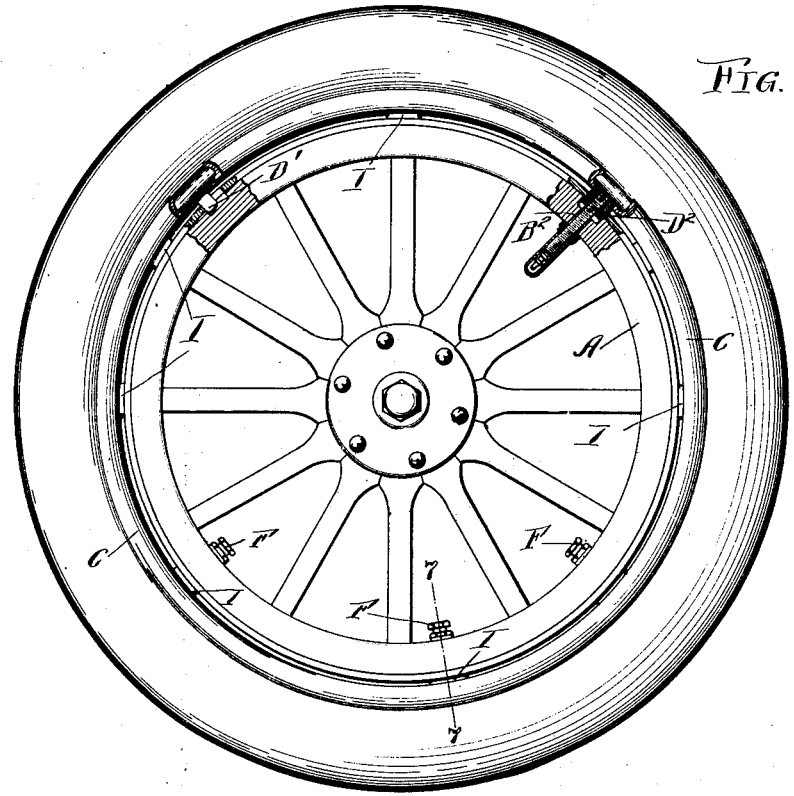
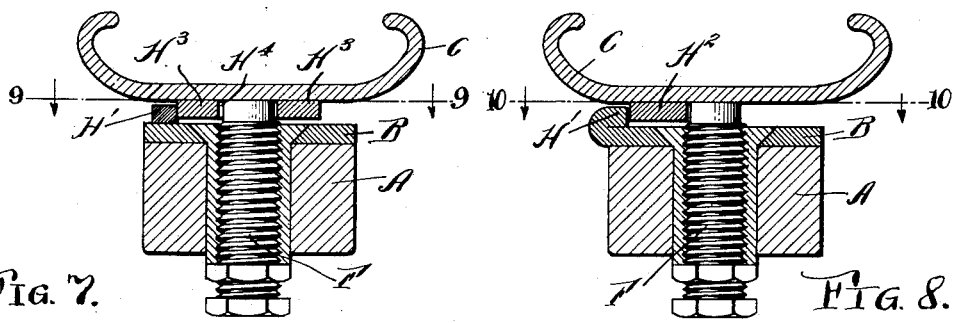
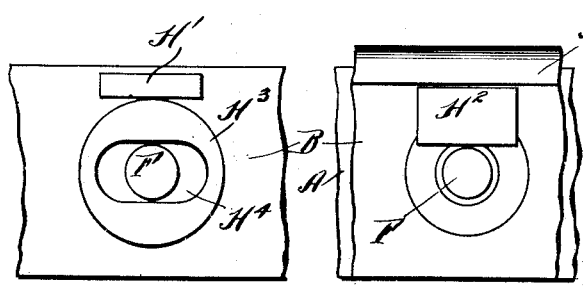
Inventor,
Orel A. Parker
By Hull Smith Brock & West
Attys.

UNITED STATES PATENT OFFICE.

ORREL A. PARKER, OF CLEVELAND, OHIO.

DEMOUNTABLE RIM.

1,384,274.  Specification of Letters Patent. Patented July 12, 1921.

Application filed January 10, 1917. Serial No. 141,704.

*To all whom it may concern:*

Be it known that I, ORREL A. PARKER, a citizen of the United States, residing at Cleveland, in the county of Cuyahoga and State of Ohio, have invented a certain new and useful Improvement in Demountable Rims, of which the following is a full, clear, and exact description, reference being had to the accompanying drawings.

This invention relates generally to automobile wheels and more particularly to means for, or manner of securing demountable tire carrying rims to the fellies of said wheels.

Various means have been devised for securing the demountable rim upon the felly, but all or nearly all are composed of or embody a large number of parts operating upon the rim at a correspondingly large number of separate points, and great care and skill must be exercised in manipulating the separate devices in order to secure the rim properly centered and in a true plane. The object of the present invention therefore, is to provide a rim fastening means which shall embody the minimum number of parts and which will correspondingly eliminate the chances of improperly fastening the rim upon the felly.

With this object in view and others will become apparent as the description proceeds, the invention may be said to consist in the novel features of construction and the manner of combining them, all of which will be fully described hereinafter and pointed out in the appended claims.

In the drawings forming a part of this specification, Figure 1 is a face view partly in section of an automobile wheel embodying my invention, Fig. 2 is a similar view showing a slight modification; Fig. 3 is a section on the line 3—3 of Fig. 1; Fig. 4 is a section on the line 4—4 of Fig. 1; Figs. 5 and 6 show detail plans and sectional views of the sleeve or bushing construction on the line 5—5 and 6—6 of Fig. 3; Figs. 7 and 8 show slight modifications of the constructions shown in Figs. 3 and 4; and Figs. 9 and 10 are detail sections on the lines 9—9 and 10—10 respectively.

In the practical embodiment of my invention I employ a wheel body A, about one-half of which is concentric and the other part is made slightly eccentric by removing a small part of the felly as indicated at A', in order that the demountable rim C may be freely and easily slipped on or off.

If desired this eccentricity could be obtained by making the wheel a true circle and placing the hub bore slightly to one side of the true center of the wheel body.

A continuous metal felly band B is fastened upon the wheel body in the usual or any approved manner and conforms to the eccentricity of said wheel.

The wheel body thus constructed is intended to receive thereon a tire-carrying rim C which is as nearly a perfect circle as such rims are made commercially and this rim can be of the clencher, straight side, or any other type and either continuous, or transversely or longitudinally split as preferred.

The tire-carrying rim C has driving lugs D which enter recesses B' in the felly band, and the valve stem E of the tire projects through the rim and is intended to pass through an opening $B^2$ in the felly of the wheel body. In Fig. 1 I have shown two driving lugs close together, one on each side of the valve stem, but in Fig. 2 the valve stem is shown spaced from the driving lug D' about 90° so as to afford separate points of lateral support. In this construction I prefer to pass the valve stem through a driving lug $D^2$ which is made tubular for that purpose.

The openings of the driving lugs and valve stem are made in the concentric portion of the wheel body and when the rim is placed upon this wheel body, one-half of the rim contacts with the concentric portion of the wheel body, while the other half of the rim will fall freely around the eccentric portion of the wheel body, there being a clearance between the felly band and rim due to the eccentricity of the wheel body, this clearance being greatest at the middle of the eccentric portion and gradually diminishing toward each side until this clearance finally becomes lost at the points where the eccentric merges into the eccentric portion of the wheel body. In order to tension the rim and take up this clearance and draw about half of the rim firmly upon the concentric portion of the wheel body 1 employ radial bolts or screws F (three being shown), passing through the eccentric portion of felly and band and bearing against the contiguous portions of the demountable rim. These bolts or screws F work through threaded bushings or sleeves G inserted in the felly of the wheel body, the outer ends of these bushings being countersunk in the felly band so that the headed outer end of the bolt will not protrude beyond the surface of said felly band. These bushings or sleeves may be formed in any suitable manner to prevent rotation, but in practice I prefer to not only provide a countersink opening in the felly band but also provide oppositely disposed notches $B^3$ to receive the fins $G^3$ formed upon the exterior of the bushing adjacent its outer end.

This brings the bushing and felly band into locked relation and puts the strain upon the metal parts instead of upon the wood. If desired, however, the exterior of the sleeve or thimble can be milled or serrated and forced into engagement with the wooden felly.

The radial bolts or screws are forced into engagement with the rim in order to tension said rim upon the wheel body, and to prevent lateral displacement or working off of the rim, I provide said rim with suitable means which shall coöperate with the radial screws or bolts and prevent such lateral displacement. In the drawings I have shown various form of devices for accomplishing this result, and any one of them will be found thoroughly efficient.

In the construction shown in Fig. 3, I employ two metal blocks or strips H spot-welded or otherwise secured to the inner face of the rim and spaced apart sufficiently to permit the flattened end $F'$ of the bolt or screw to pass between them, while in Fig. 8 only one block $H'$ is fixed upon the inner face of the rim and which is adapted to engage with a stop or shoulder $H^2$ formed upon the inner side of the felly band, the radial screw passing in front of said block or strip to prevent the outward lateral movement of the rim. In Fig. 7 a slotted button or plate $H^3$ is fixed upon the inner side of the rim and the end of the radial bolt is adapted to enter the slot $H^4$ while tensioning the rim, thereby holding said rim against lateral displacement. The slot $H^4$ is preferably elongated so that slight circumferential displacement of the rim will not interfere with the operation. In the construction shown in Fig. 3, the block adjacent the outer edge of the rim is provided with an inwardly projecting portion which acts as a stop, and in the constructions shown in Figs. 7 and 8, the felly band can be provided with a stop against which the button or plate $H^3$ will contact.

In the construction shown in Fig. 1, the wheel is made very slightly eccentric as shown at $A'$ and the felly band is fitted tightly upon and conforms to the wooden felly. The rim C fits closely upon the concentric portion of the felly band and is tensioned along the remaining portion. In the construction shown in Fig. 2, both the rim and wheel as originally constructed are concentric but in order to provide the desired eccentricity, spacing blocks I are arranged upon one side of the wheel body with which blocks about one-half of the rim contacts, and the blocks, strips or buttons attached to the opposite side of the rim are of varying thicknesses according to the positions they occupy, that is the central block, strip or button is slightly thinner than the blocks upon each side thereof. In operation the valve stem is projected through the valve stem hole and the dowel or dowels are brought into engagement with the dowel recesses and the rim is then dropped until it comes to its correct axial position which is determined by the stops on either the rim or the felly band as the case may be. Then by turning the radial bolts so as to force them outwardly, their outer ends contact with the inner face of the rim and the continued turning of said bolts thoroughly tension the rim, drawing said rim upon about one-half of the wheel body and tensioning the rim as a whole by means of the radial bolts; and inasmuch as the rim is provided with blocks, strips or buttons, opposite one or more bolts, they will, in connection with the radial bolt, hold said rim against lateral movement so that after the rim has once been properly positioned and tensioned, all danger of working loose is avoided, and the rim is held on the wheel even if the radial bolts are only partially tightened.

It will thus be seen that I provide a wheel body and demountable tire-carrying rim which can be quickly and easily placed upon the wheel body and tensioned, as it will be noted that the number of working parts are reduced to a minimum, thereby rendering the device as a whole quick and easy of operation and accurate in its final adjustment.

Having thus described my invention what I claim is:

1. The combination with a wheel the body portion proper of which is eccentric, of a demountable tire carrying rim, means exerting radial pressure only upon said rim, and means coöperating with said radial pressing means to prevent lateral displacement.

2. The combination with a wheel the body portion proper of which is eccentric, a circular demountable tire carrying rim, radial tensioning bolts adapted to engage said rim at points adjacent said eccentric portion, and means carried by said rim adapted to coöperate with said bolts to prevent lateral displacement.

3. The combination with a wheel the body portion of which is eccentric, a circular demountable rim, radial bolts carried by said wheel body and adapted to exert radial pressure only upon said rim and a plate carried by said rim and adapted to coöperate with said radial bolts to prevent lateral displacement.

4. The combination with a wheel the portion of which is eccentric, a circular demountable tire carrying rim, radial tensioning bolts adapted to engage said rim at points adjacent said eccentric portion of wheel body, and means carried by said rim adapted to coöperate with said bolt to prevent lateral displacement.

5. The combination with a wheel body a portion of which is eccentric, of a demountable tire carrying rim, means for exerting radial pressure only upon that part of the rim adjacent the eccentric portion of the wheel, a positive stop carried by said wheel body at one side thereof, and means carried by said rim adapted to rest between said positive stop and tensioning means and hold said rim against axial movement.

In testimony whereof, I hereunto affix my signature.

ORREL A. PARKER.